United States Patent [19]

Worner

[11] Patent Number: 5,364,441
[45] Date of Patent: Nov. 15, 1994

[54] COTREATMENT OF SEWAGE AND STEELWORKS WASTES

[75] Inventor: Howard K. Worner, Wollongong, Australia

[73] Assignee: Illawarra Technology Corporation Limited, Wollongong, Australia

[21] Appl. No.: 916,983

[22] PCT Filed: Feb. 13, 1991

[86] PCT No.: PCT/AU91/00048
§ 371 Date: Aug. 13, 1992
§ 102(e) Date: Aug. 13, 1992

[87] PCT Pub. No.: WO91/12210
PCT Pub. Date: Aug. 22, 1991

[30] Foreign Application Priority Data

Feb. 13, 1990 [AU] Australia ............... PJ8617

[51] Int. Cl.$^5$ .................................. C22B 7/02
[52] U.S. Cl. .................... 75/10.1; 75/10.63; 75/416; 75/430; 75/961; 423/107
[58] Field of Search ........... 75/961, 10.1, 10.31, 75/10.32, 10.63, 500, 430, 431, 416; 423/107

[56] References Cited

U.S. PATENT DOCUMENTS

| 3,262,771 | 7/1966 | Ban ........................ 75/10.31 |
| 3,770,419 | 11/1973 | Brown .................... 75/407 |
| 4,711,727 | 12/1987 | Matthews et al. ........ 210/727 |
| 4,758,268 | 7/1988 | Bishop et al. ........... 75/958 |
| 4,793,855 | 12/1988 | Hauk ...................... 75/560 |

FOREIGN PATENT DOCUMENTS

| 4813864 | 10/1965 | Australia . |
| 6682065 | 5/1968 | Australia . |
| 130266 | 7/1968 | Australia . |
| 5085473 | 7/1974 | Australia . |

OTHER PUBLICATIONS

Patents Abstracts of Japan, C-15, p. 67, 55-49200 Nippon Process Engineering KK, Apr. 9, 1980.

Primary Examiner—Melvyn J. Andrews
Attorney, Agent, or Firm—Hawes & Fischer

[57] ABSTRACT

Steelworks dusts or sludge is mixed into sewage preferably in the presence of a flocculating agent to provide a rapid separation of a clear effluent and a sludge which is dewatered and dried to form a solid material adapted to entrap harmful materials in the sewage such as heavy metals, pathogens and organic chemicals. The solid material is supplied to a smelt reduction furnace from which molten iron is recovered and a hot gas discharge is provided from which recovery of zinc and other materials may be achieved, other waste material being removed as a slag.

15 Claims, 3 Drawing Sheets

COTREATMENT OF SEWAGE AND STEELWORKS WASTES

The present invention relates to the treatment of wastes and is more particularly concerned with treatments which are environmentally beneficial and efficient.

In this specification, some embodiments of the invention will be described in terms of a process using fine particulate wastes containing iron values and which are generally referred to as steelworks dusts. In modern steelmaking such ferruginous dusts are produced particularly during oxygen steelmaking and electric steelmaking, the dust frequently containing significant zinc values. In some steel making plants, a wet process is used for removing the waste and the steelworks dusts are in the form of a sludge, but in this specification the term "steelworks dusts" will be used to cover the fine wastes from steelworks whether in dust form or sludge form. However, it is to be understood that the invention is not necessarily limited just to the processing of such steelworks dusts and analogous applications may exist.

Generally steelworks are located in areas having substantial populations in the vicinity and accordingly having a major problem in dealing with sewage sludges, the disposal of which is often environmentally harmful. Sewage sludges may contain pathogens as well as harmful chemicals in small quantity, such as heavy metals and chlorinated and fluorinated hydrocarbons.

There is also a widespread problem in modern steelworks in dealing with the steelwork dusts. These dusts contain zinc oxide and spinels which result in the dust being unsuitable for return to sinter plants and from there back to blast furnaces since the zinc content creates problems to upper refractories in the shaft of a blast furnace. A large proportion of modern steelworks dusts are micron-sized particles mainly of iron and iron oxides in which the whole range of valencies of iron are represented. Furthermore the dusts usually contain a variety of calcium-containing compounds, zinc-containing compounds and carbon-containing compounds.

When applied to the treatment of sewage and steelworks dust, the invention is based on the concept of mixing the dusts with sewage, extracting solids and processing the solids in a smelting operation to produce molten iron and a hot gas discharge, the sewage solids including carbon compounds which are a source of carbon in the smelting process for reduction of the iron compounds in the dust and also provide a source of fuel for the smelting operation. However, the invention consists also in a process of separating from sewage solid material as sludge and also in a separate process of smelting sewage sludge.

According to a first aspect of the present invention, there is provided a method of processing sewage comprising mixing steelworks dust into sewage, separating clear effluent to leave sludge, dewatering the sludge and substantially reducing the moisture content of the sludge and producing solid material which can be handled conveniently and is suitable for subsequent smelting to provide valuable metal fractions and to dispose of the organic solids content of the sludge by combustion.

According to a second aspect of the present invention, there is provided a method of treating steelworks dusts comprising taking solid material comprising a mixture of steelworks dusts and sewage sludge, smelting the solid material in a smelt reduction furnace by using carbon-containing compounds in the sludge to reduce metal values in the steelworks dusts and to combust sewage-sourced components in the sludge, and collecting the metal values.

It is particularly advantageous to combine in a process the steps of the first and second aspects of the invention, but it is to be understood that practising either aspect alone is within the scope of the present specification, the process being characterized by interacting steelworks dusts and sewage waste whereby useful material is separated. Furthermore, it is within the scope of the present invention to use some steelworks dusts for settling sewage sludge and to include other materials to aid settling. Additional steelworks dust may be mixed with the solid material separated from the sewage before smelting operations.

In use of the first aspect of the present invention, when steelworks dust is used as settling agent, the mixing step exploits the relatively high surface area of the fine steelworks dusts and the active chemical nature of the compounds in the dusts. The compounds advantageously can react with and/or chemically adsorb onto the solid particles in sewage, these particles comprising organic matter, pathogens and heavy metal compounds.

In some embodiments of the invention, it is desirable to add in the mixing step some flocculating agent to enhance the interaction between the steelworks dusts and the solid components of the sewage to form a composite solid material which can be readily separated. Preferably, the flocculating agent is cationic.

Furthermore bactericidal material may be advantageously added to the mixing stage of the process.

Preferably, the sewage undergoes preliminary screening to remove components such as large pieces of plastics material and grit. Steelworks dust is then mixed with the sewage vigorously and it is then preferable to engage in a settling process and dewatering to provide a resultant sludge. It is thought that in many embodiments the use of steelworks dusts facilitates efficient rapid settling of the solids in sewage thereby helping the process to yield cleaned water which might be usable for irrigation or industrial purposes. The settled sludge, because of the ferruginous matter present, will be denser than sludge derived by conventional treatment of the sewage and this extra density facilitates subsequent dewatering processes, for example by centrifuging and belt pressing.

The invention can also be implemented by mixing in the sewage other fine particulate matter such as finely crushed mill scale, fine particulate carbons from coke ovens and fine metal particles, thereby increasing the proportion of iron and carbon in the sludge.

Most steelworks dusts have sufficient calcium containing material in the dust to provide appropriate flux material for the smelting operation forming the later step of the present process. Burnt lime or slaked lime can be added at the stage of mixing and sludge formation to provide the required calcium. However, more importantly it has been found that the lime is effective in reducing the biological oxygen demand (B.O.D.) in the effluent without deleteriously raising the alkalinity of the effluent. In this specification references made to "lime" and this is to be understood as referring to burnt lime or slake lime, mixtures thereof and mixtures incorporating other calcium rich compounds.

Experiments in the settling of solid material from sewage has shown that a wide range of proportions of steelworks dust to lime can be used to achieve high settling rates and a beneficial reduction in the BOD thereby leaving a liquid which may well be considered suitable for discharge for example for irrigation purposes.

Preferably embodiments of the invention include drying the dewatered sludge, e.g. by solar drying if the climate is suitable or by utilization of hot off-gases in the steelworks, e.g. from the smelting step of the present process. It may be desirable to use odour control techniques during this drying stage.

To facilitate subsequent handling of the solid material, after the drying step at which the moisture content of the sludge is very low, the solid material is extruded and formed into lumps or otherwise formed into a convenient mass such as by briquetting; this step produces "composites" of uniform cross-sectional shape to facilitate handling in subsequent stages.

One example of known technology for drying the solid material can also conveniently provide controlled preheating of the solid material which is advantageous before the material is introduced into the smelting stage. The technology is described in Australian patent specification 15299/88 (and in equivalent U.S. Pat. No. 4,906,290) entitled "Microwave Irradiation of Composites" by the present inventor. However it is to be understood that the present invention is not limited to any particular drying or heating technique and generally any suitable drying process can be used.

Frequently sewage contains various oils and the invention can be applied in a method which incorporates a step for removal and collection of oils. The oils are taken up by the solid material and kept with the solid material during the dewatering process. When the composites are produced with appropriate temperature control e.g. in the range 100° C. to 450° C., the oils can be steam-distilled off and collected. Preferably the drying and preheating step applied to the solid material avoids temperatures exceeding about 450° C. since then charring of the carbonaceous material in the composites can become dominant and it is preferred to retain the pyrolytic properties of the components in the composites such that their fuel value is preserved for use in the subsequent smelting stage.

The smelting stage of the present process, when applied to steelworks dusts, produces molten metal, primarily iron, on top of which a slag is formed and hot gases are given off which can be subsequently processed, for example by precipitating zinc oxide which forms in the hot off-gas thereby providing a marketable zinc compound and removing what would otherwise be an unwanted contaminant. The treated gases can then be used for preheating steps in the process or otherwise used in the plant.

Preferably, the smelting step uses a smelt-reduction furnace such as counter-current flow furnace designed by the present inventor. In one form the furnace provides essentially a bath with an inlet for solid feed material at an upper location and one or more lances for introduction of air or oxygen enriched air which have a vigorous stirring action and provide oxygen for reaction with the burning fuel. A slag forms on the surface of the molten iron and separate tapping points are provided respectively for the slag and iron.

The use of the lances provides a turbulence for "splash" effect and heat transfer thereby is relatively efficient from the gas phase back to the slag and molten metal.

An alternative counter-current furnace is One utilising an electric arc between electrodes. Such a furnace would utilise an oxygen lance through which also lime can be introduced and turbulent conditions are established to ensure vigorous dispersal of the solid feed material in the melt.

Yet a further option is to utilise a smelt furnace operating under plasma technology.

Preferably a counter-current furnace used in embodiments of the present invention is generally barrel-shaped and operated such that temperatures in excess of 1500° C. are obtained in the gas phase. Such a temperature is highly beneficial, not only for the smelting process but also to achieve destruction of potentially harmful components of the sewage and in particular chlorinated or fluorinated hydrocarbons and pathogens. It is suggested that this process offers considerable benefits when compared with conventional sewage sludge incineration.

Furthermore, use of the preferred smelt-reduction furnace may be beneficial in fullycombusting graphite often found as "KISH" graphite in steelworks dusts.

In preferred embodiments, the process is controlled such that the bath temperature of the melt is in the range 1420° C. to 1500° C. and the gas temperatures above the bath are in the range 1550° C. to 1650° C. These conditions facilitate burning of carbon monoxide which comes out of the solid feed material (composites) and also boils out of the bath. The carbon monoxide is burned within the furnace to produce carbon dioxide thereby achieving good fuel efficiency.

The process of the present invention is preferably controlled so that the total carbon present in the dried composites is well over the stoichiometric requirements for the chemical reduction of the oxidic iron and zinc in the steelworks dusts. The reasons for this include the following:

(a) The carbon in the composites has a fuel function as well as a chemical reduction function.
(b) The excess carbon provides fuel values which can achieve high gas temperatures to provide the incineration role of the process as well as transferring heat back to the slag and molten metal.
(c) The excess carbon provides fuel to maintain relatively high bath temperature which facilitates a higher rate of smelting of the composites and absorption of surplus carbon into the metal in the bath.
(d) The excess carbon provides fuel for ensuring high temperatures which cause the zinc values to boil rapidly from the molten metal. The zinc leaves the bath as elemental metal and in the gas discharge oxidises to zinc oxide.

Embodiments of the invention may usefully also permit the handling of other waste materials. Carbon-containing waste materials of diverse types might be incorporated into the smelting step. For example iron contaminated dusts, greases, oils and rags might be processed in addition to waste materials such as steel contaminated by plastic materials (which is unsuitable for conventional scrap steel recycling). Furthermore, sources of carbonaceous material for the process can include waste paper, coal fines and other products including organic chemicals which, because of very high temperature combustion, may be utilised and safely processed.

In summary at least some embodiments of the invention can permit the following advantages to be achieved:

Waste steelworks dusts can be processed to recover metal values thereby obviating storage or disposal problems and sewage can be processed to remove solids to leave cleaned water suitable for discharge or irrigation purposes; heavy metals, pathogens and organic chemicals of a potentially hazardous character often found in sewage will be removed for high temperature combustion whereby environmental contamination is obviated.

The physical interaction of steelworks dusts and sewage can be an effective relatively rapid process permitting capital-effective processing plants to be constructed.

An energy efficient process can be achieved utilising the energy values in the carbon contained in sewage sludge and metal of commercial value can be recovered in the smelting operation.

The smelting operation can provide for high temperature combustion permitting safe disposal in addition of numerous other waste products.

BRIEF DESCRIPTION OF THE DRAWINGS

Embodiments of the invention will now be described by way of example only with reference to the accompanying drawings of which:

FIG. 1 illustrates the process schematically. Screened sewage and steelworks dust are vigorously mixed and clear effluent results from a settling process. Dewatering e.g. by centrifuging takes place to give more clear effluent and a solid mass which is dried for example by the use of surplus heat from a later smelting process. A drying stage discharges steam and produces oils which may be used as a fuel or may have marketable value. The resultant solids are slightly damp and agglomeration, for example including briquetting, takes place to produce solid composites. The next step is drying and preheating step. An important economic factor is that surplus heat from off-gas from the smelting furnace is available for use in the drying and preheating step and thus an energy efficient process is available.

The solid composites are fed into the smelting furnace which yields molten iron which has market value as well as slag and the hot gas discharge contains zinc oxide which can be collected and also has market value.

Figure 2:
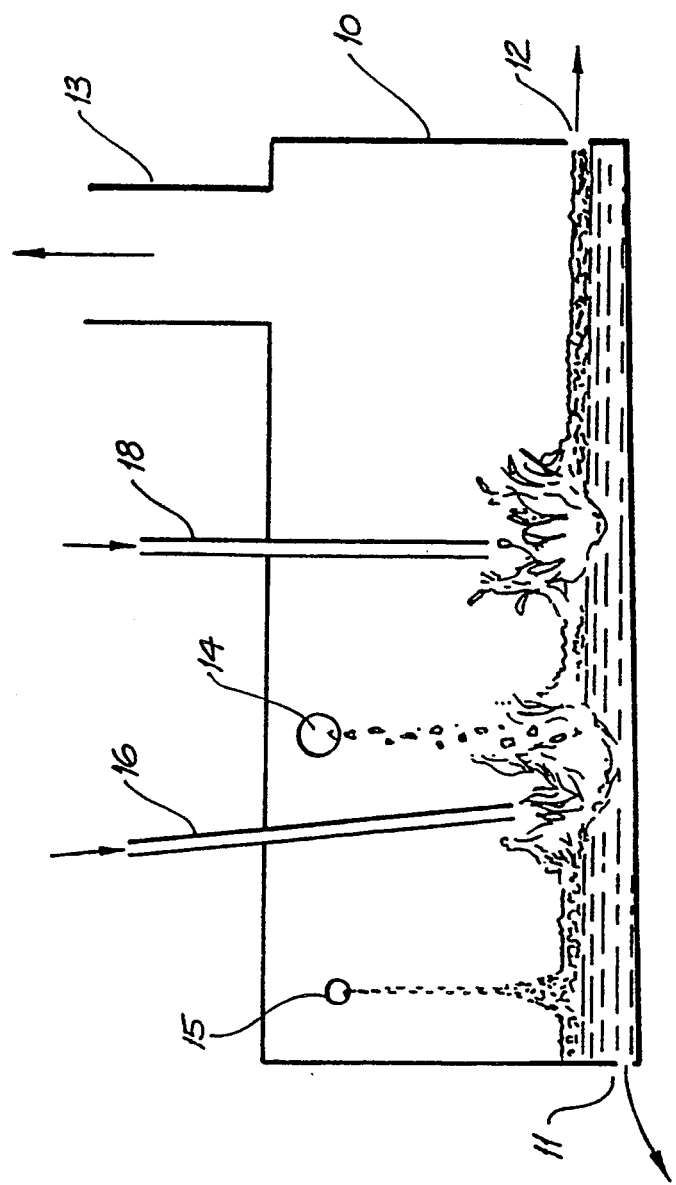
FIG. 2 is a schematic drawing of one embodiment of smelting furnace for use in the process.

Referring now to FIG. 2, the schematic drawing shows a barrel-shaped furnace which advantageously could be provided with a slight slope along the bottom towards a discharge point for molten foundry type iron. The furnace has a refractory lined body 10 with a molten iron tapping point 11 at the left hand end as shown and slightly above the refractory in the bottom of the barrel. At the right hand end is a slag tapping point 12. Above the right hand end is a hot gas discharge duct 13.

In the upper central region of the barrel but slightly offset towards the Pig iron duct 11 is an inlet duct 14 for hot solid composites which fall into the bath. If the process requires the addition of extra burnt lime to aid the metal refining operation, then burnt lime is added through an inlet 15 above the left hand end region of the bath. The furnace of FIG. 2 operates as a counter-current furnace and vigorous turbulence within the bath is important to ensure effective operation. The lances 16 and 17 achieve this turbulence by introducing air or air enriched with oxygen in jets which vigorously agitate the central portion of the bath. The lance 18 nearer the hot gas discharge terminates at a higher level above the slag particularly for aiding post-combustion to the CO rich gas phase.

Figure 1:
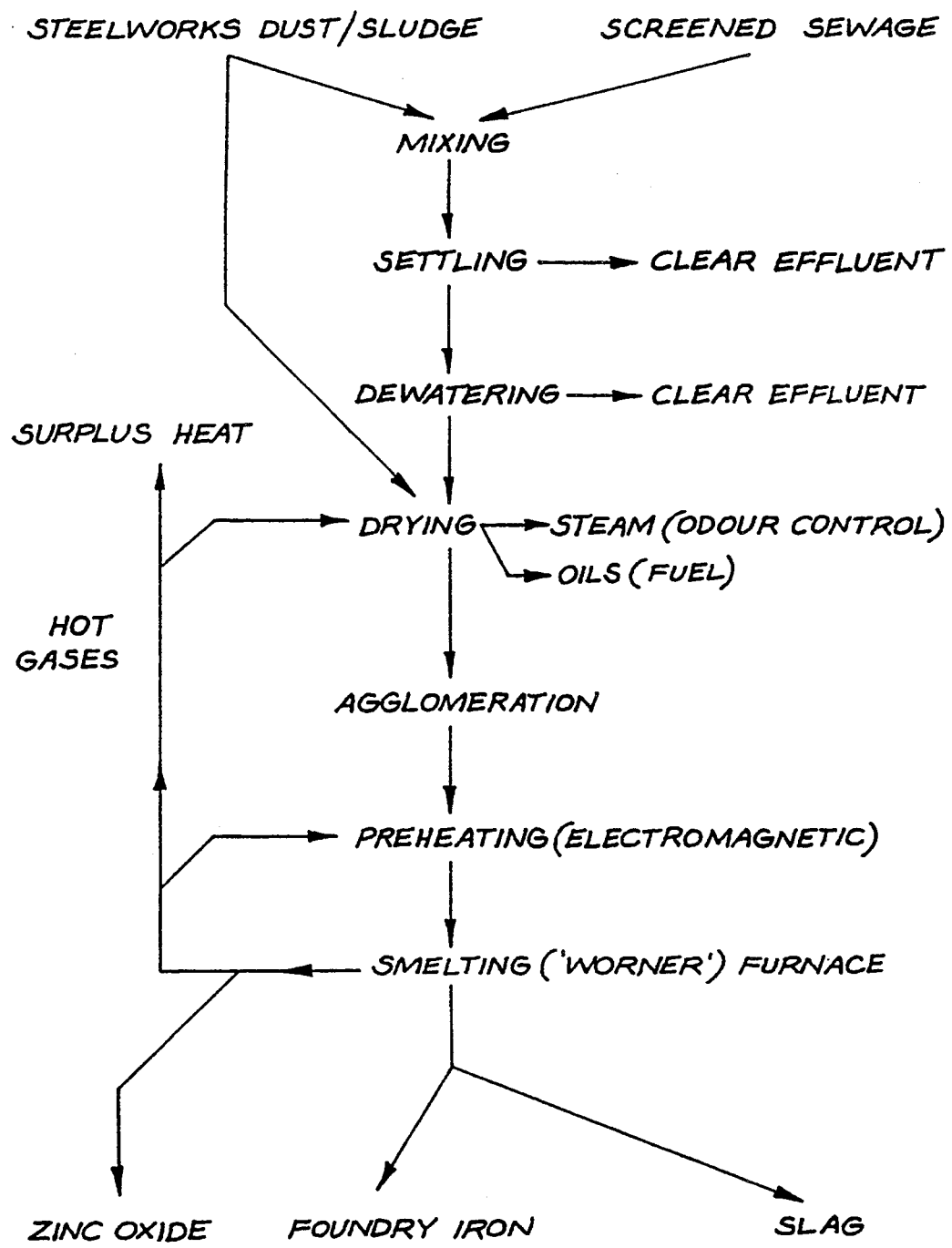
FIG. 1 is a flow chart illustrating a process embodying the invention.
Figure 3:
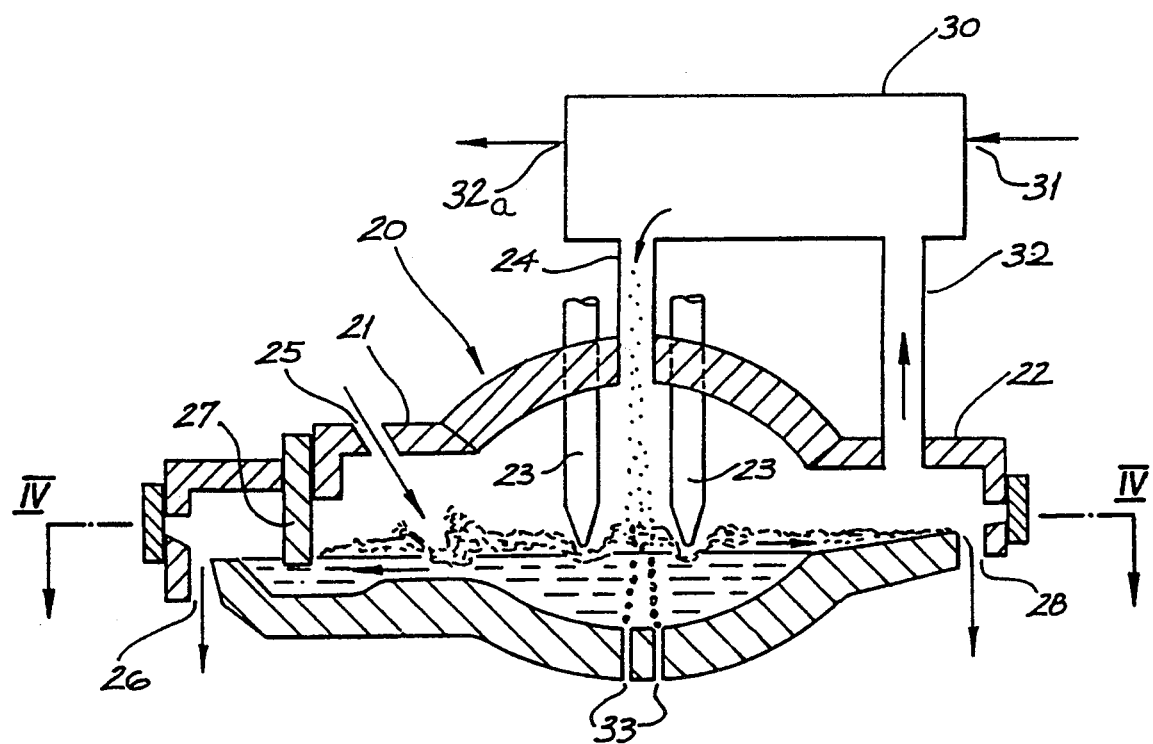
FIG. 3 is a cross-sectional, elevation view showing schematically a second embodiment of smelting furnace.
Figure 4:
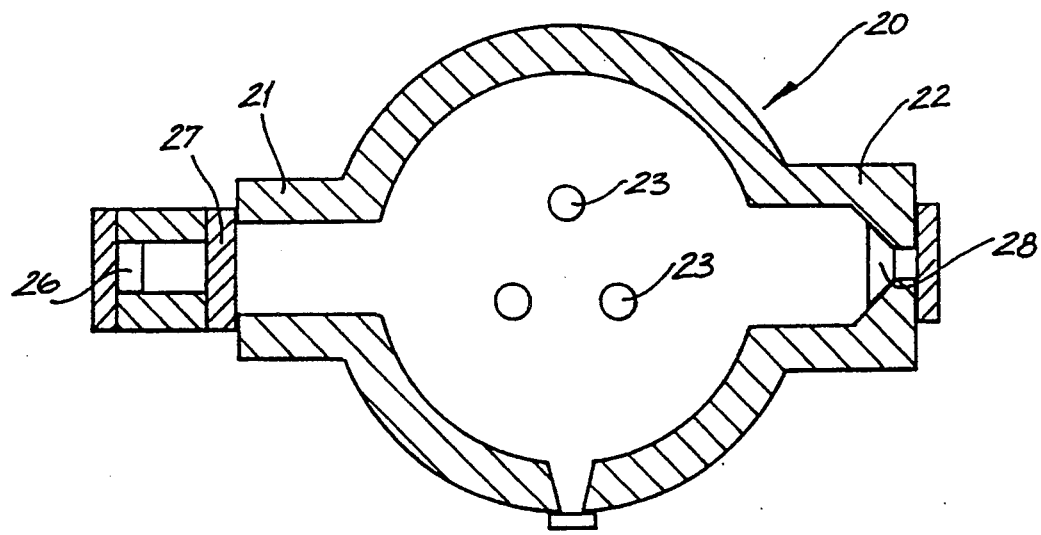
FIG. 4 is a sectional plan view of the furnace of FIG. 3 and taken along the line of IV—IV of FIG. 3.

Referring now to the embodiments in FIGS. 3 and 4, the furnace has a body portion 20 in its central region with first and second extensions 21 and 22 of general cylindrical form on opposite sides. A set of electrodes 23 extend centrally down into the bath for establishing an electric arc, the electrodes being adjacent and an inlet duct 24 for solid feed material. Centrally located in the bottom of the furnace of 20 is a set of gas injection jets 33 for admitting a mixing gas which is optional but can be applied to ensure vigorous turbulence of the molten bath.

The establishment of turbulence is aided by the application of an oxygen jet through an inlet 25 in the first extension 21, this inlet also being adapted to admit lime. It will be noted that a counter-current flow in the furnace occurs by virtue of the first extension 21 leading to a discharge duct 26 for iron, a weir 27 being provided to restrain flow of slag towards the iron discharge point. At the opposite side, the furnace has a higher discharge opening 28 for discharging molten slag.

As schematically shown above the furnace, a preheating apparatus 30 is provided, the apparatus having an inlet schematically shown at 31 for feeding horizontally solid feed stock material and adjacent thereto a hot gas inlet 32 from the furnace. This hot off-gas acts to preheat and to pre-reduce partially the solid material in the composites. The gas, at a lower temperature, is discharged through discharge 32a for further processing including removal of zinc and other metal values.

The equipment is operated so that temperatures in excess of 1300° C. are achieved whereby any material entering the gaseous stage from the feedstock material capable of decomposition or combustion is so treated so that discharged hot gases will not contain any harmful materials such as organic chemicals. The feedstock material conveniently can be in briquette form or other essentially dustless form to facilitate handling. Since the solid material is immersed in the turbulent molten bath at around 1500° C., the resultant hot gases cannot contain harmful materials such as highly toxic organic compounds due to the combustion that occurs.

An illustrative example of a pilot plant experiment will now be given. It will be appreciated that the composition of sewage varies from day to day at a particular plant and also varies between plants. Therefore adjustment of process conditions for optimisation will be necessary and the following details are just one example.

A screened sewage effluent comprising 265 ppm suspended solids and having a biological oxygen demand (BOD) of 270 was introduced into a continuous processing system at a rate of 100 liters per minute. Waste ferruginous steelworks dust and waste steelworks fine lime were vigorously mixed into the effluent stream so as to achieve in the stream 170 ppm of ferruginous dust and 100 ppm of lime kiln fines (calculated on a dry basis). The steelworks dust contained 9–12% carbon in the form of coke fines and "Kish" graphite.

The effluent was allowed to flow into a second tank and at that point while maintaining the stirring, cationic flocculent was added to achieve an equivalent of 15 ppm in the flowing, dust-containing sewage. Conveniently the flocculent (commercially available Catoleum AA186H) was added as a conditioned liquid form flocculent. The flow passed into an elongated settling tank and it was found that rapid settling of flocculated material occurred, the liquid phase remaining in the range pH 6 to 7 for the process, and the experiment continuing over a period of 24 hours. The settled sludge mixture was found to have a pH of 11 and it was found that a 90% reduction of suspended solids in the sewage was achieved together with a reduction in the BOD value greater than 70%. Furthermore, for certain heavy metals in the sewage a reduction in the range 80 to 90% was achieved; in this case removal of most of the copper, cadmium and zinc content in the sewage was achieved. The sewage also contained trace amount of other heavy metals such as nickel, chromium and lead and significant removal of these trace amounts occurred.

At appropriate intervals, settled sludge was removed from the settling tank through a base off-take. The sludge was centrifuged to bring the water content to about 55% by weight, belt pressing was effected to reduce the water content to the range 30–35% and more steelworks dust in dry form was mixed throughly into the sludge mass to further reduce the moisture concentration and to raise the iron content on a dry basis to the range 45–50%.

Furthermore by appropriate blending, the carbon content of the solid mass was adjusted to ensure that there would be surplus carbon, in the order of 75%, over that theoretically required in the subsequent smelting step to reduce the iron and zinc oxidic materials in the dust. It is to be noted that as the steelworks dust contained between 9 and 12% carbon, and because the sewage component contained carbonaceas material, only minor adjustment of carbon content would normally be required. Furthermore, the steelworks dust and lime added in the settling stage provided ample calcium containing material to provide a basic slag in the subsequent smelting operation.

A mixer-extruder was used to form rods of damp sludge of approximately 25mm diameter, these rods then being dried by a combination of solar drying and warming from hot off-gases from the smelting furnace, thereby providing a feed stock for the smelting furnace.

For the purpose of experiment, a batch-wise smelting operation was conducted in a barrel-shaped furnace lined with magnesite/dolomite basic bricks and rammed refractory. Heating was achieved by oxy-gas torches and lances and the process conditions were operated such that the metal bath was at a temperature in the range 1475° C. to 1525° C., with a slag layer generally being 20° to 50° C. hotter than the metal. The dry warm "rods" were fed into the furnace in a turbulent splash zone near a central oxy-gas lance. The slag phase was maintained with a (lime+magnesia):(silica+alumina) ratio of 2 or greater.

Experiments were conducted and it was found that where it was desired substantially to remove a phosphorus component in the iron melt, the oxygen ratio in a oxy-gas burner or jet located near the metal tapping end of the barrel-shaped furnace could be increased to provide a more oxidising slag.

It was found that the smelting operation consistently produced iron with greater than 4% carbon, silicon levels ranging from 0.6 to 1.2% and phosphorus levels between 0.1% and 1.2%, depending upon the degree of oxidation of the slag. Generally a sulphur content of less than 0.05% was achieved.

The resultant slag was found to be similar to blast furnace slag and by using a simple condenser in the off-gas system, metal oxide was collected for analysis and found to have a zinc oxide content in the range 97 to 99%.

I claim:

1. A method of processing sewage having a liquid portion including water and a solid portion including carbon-containing compounds and steelworks dusts having metal values, said method comprising the steps of mixing the steelworks dusts and the sewage to form a mixtures, processing the mixture to separate out the water from the liquid portion of said sewage and leaving a wet sludge containing substantially all of the carbon containing compounds from the solid portion of said sewage and substantially all of the metal values of said steelworks dusts, dewatering and drying the sludge to provide a solid composite material, supplying the composite material to a smelt reduction furnace and smelting the material to reduce the metal values in the sludge to molten metal and to combust the carbon-containing compounds in the sludge to produce an off gas and collecting the metal values.

2. A method as claimed in claim 1 and wherein the step of smelting said composite material is effected in a smelt reduction furnace of generally barrel-shaped form and substantially horizontal axis, said composite material being smelted into a melt with molten slag formed as a layer over the melt and gases containing carbon melt, the method including tapping off the molten slag at a first location in the furnace and tapping off the melt at a remote second location.

3. A method as claimed in claim 2 and wherein at least two lances are used to introduce air and/or oxygen for combustion in the form of jets, the jets being arranged to cause turbulence within the melt.

4. A method as claimed in claim 3 and wherein one of said lances has a discharge substantially above the melt to aid combustion of the carbon monoxide in the gases above the melt.

5. A method as claimed in claim 2 and wherein the furnace is an electric arc furnace having electrodes disposed for causing vigorous turbulence in the melt and adjacent to a location for feed of the solid composite material.

6. A method as claimed in claim including adding lime, the lime providing a source of calcium for slag formation during the step the composite material.

7. A method as claimed in claim 6 and wherein the addition of lime includes adding lime to the sewage whereby the liquid portion thereof has a reduced biological oxygen demand and the solid composite material formed by dewatering and drying said sludge contains compounds for use in slag formation in the smelting step.

8. A method as claimed in claim 1 and including the additional step of processing the solid composite material formed by dewatering and drying said sludge to form briquettes, the briquettes providing feedstock material for the smelting step.

9. A method as claimed in claim 1 wherein said sewage also has oils, such that said solid composite material formed by dewatering and drying said sludge contains said oils, said method including the additional step of preheating said solid composite material during said smelting to distill off said oils from the composite material and recovering said oils.

10. A method as claimed in claim 1 and including processing a hot gas discharge from the smelting operation, allowing zinc in the hot gas discharge to oxidise with atmospheric oxygen and form zinc oxide and collecting the zinc oxide.

11. A method as claimed in claim 1 and including mixing the steelworks dusts with sewage in the presence of a flocculating agent.

12. A method as claimed in claim 11, wherein the flocculating agent is cationic.

13. A method as claimed in claim 1 and including the additional step of mixing the steelworks dusts and lime into the sewage at about the same concentration by weight as the solid portion of said sewage.

14. A method as claimed in claim 1 and including the additional step of mixing lime into the sewage to provide a substantially neutral pH in the liquid portion thereof while the solid portion of the sewage is settling and a pH of about 11 in the resultant sludge.

15. A method as claimed in claim 1 wherein said metal values of said steelworks dusts include iron, such that said solid composite material formed by dewatering and drying said sludge contains said iron, said method including the additional step of treating the composite material with ferruginous dust to raise the iron contained by said composite material to the range of 35-50% by weight.

* * * * *